(12) United States Patent
Mueller et al.

(10) Patent No.: US 12,526,022 B2
(45) Date of Patent: Jan. 13, 2026

(54) METHOD AND APPARATUS FOR A RADIO NETWORK

(71) Applicant: Nokia Technologies Oy, Espoo (FI)

(72) Inventors: Axel Mueller, Paris (FR); Salah Eddine Hajri, Antony (FR); Marco Maso, Issy les Moulineaux (FR); Filippo Tosato, Bures sur Yvette (FR); Luca Rose, Orsay (FR)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 18/246,441

(22) PCT Filed: Sep. 30, 2021

(86) PCT No.: PCT/EP2021/076913
§ 371 (c)(1),
(2) Date: Mar. 23, 2023

(87) PCT Pub. No.: WO2022/073839
PCT Pub. Date: Apr. 14, 2022

(65) Prior Publication Data
US 2023/0403059 A1 Dec. 14, 2023

(30) Foreign Application Priority Data

Oct. 5, 2020 (EP) .................................... 20199993

(51) Int. Cl.
*H04B 7/06* (2006.01)
*H04L 5/00* (2006.01)
*H04W 24/10* (2009.01)

(52) U.S. Cl.
CPC ......... *H04B 7/0626* (2013.01); *H04L 5/0053* (2013.01); *H04W 24/10* (2013.01)

(58) Field of Classification Search
CPC ..... H04B 7/0626; H04L 5/0053; H04W 24/10
See application file for complete search history.

(56) References Cited

U.S. PATENT DOCUMENTS

| 2018/0167116 A1 | 6/2018 | Rahman et al. |
| 2020/0099432 A1* | 3/2020 | Määttänen ........... H04B 7/0617 |

(Continued)

FOREIGN PATENT DOCUMENTS

| WO | 2012/036513 A1 | 3/2012 |
| WO | 2018/171678 A1 | 9/2018 |

(Continued)

OTHER PUBLICATIONS

3GPP Draft: R1-1712374 (Year: 2017).*

(Continued)

*Primary Examiner* — Deepa Belur
(74) *Attorney, Agent, or Firm* — Lippes Mathias LLP

(57) ABSTRACT

A method for operating a first apparatus (102) and the first apparatus (102) comprising at least one processor, at least one receiver and at least one memory including program code that, when executed by the at least one processor, cause the first apparatus (102) at least to receive at least one RRC configuration comprising a configuration of a channel state information, CSI, wideband report setting and a configuration of a CSI, subband report setting, receive at least one message (302) to trigger CSI wideband reporting and CSI subband reporting, and transmit a CSI wideband report (304) in a first slot comprising information on CSI wideband reporting and transmit a CSI subband report (306) comprising information on CSI subband reporting in a second slot based on the message (302) to trigger CSI wideband reporting and CSI subband reporting.

8 Claims, 4 Drawing Sheets

(56) References Cited

U.S. PATENT DOCUMENTS

| | | | | |
|---|---|---|---|---|
| 2020/0162142 | A1 | 5/2020 | Rahman et al. | |
| 2020/0235797 | A1* | 7/2020 | Kim | H04B 7/0626 |
| 2022/0123801 | A1* | 4/2022 | Chen | H04B 7/0695 |
| 2022/0149908 | A1* | 5/2022 | Gao | H04B 7/0634 |
| 2023/0170963 | A1* | 6/2023 | Wu | H04B 7/0626 370/329 |
| 2023/0189040 | A1* | 6/2023 | Ma | H04W 24/08 370/329 |
| 2024/0015546 | A1* | 1/2024 | Awadin | H04W 24/10 |

FOREIGN PATENT DOCUMENTS

| | | | | |
|---|---|---|---|---|
| WO | WO-2018173003 A1 * | 9/2018 | | H04L 5/0044 |
| WO | 2019/066565 A2 | 4/2019 | | |
| WO | 2020/113547 A1 | 6/2020 | | |
| WO | 2020/125706 A1 | 6/2020 | | |
| WO | WO-2020151559 A1 * | 7/2020 | | H04B 7/0628 |

OTHER PUBLICATIONS

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; Physical layer procedures for data (Release 16)": 3GPP TS 38.214, V16.1.0, Mar. 2020, pp. 1-151.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Multiplexing and channel coding (Release 16)", 3GPP TS 38.212, V16.1.0, Mar. 2020, pp. 1-146.

Miao et al., "Amplitude Quantization for Type-2 Codebook Based CSI Feedback in New Radio System", European Conference on Networks and Communications (EuCNC), Jun. 18-21, 2018, pp. 98-102.

"Revised WID: Enhancements on MIMO for NR", 3GPP TSG RAN Meeting #87e, RP-200474, Agenda: 9.3.1, Samsung, Mar. 16-19, 2020, 5 pages.

"New WID: Further enhancements on MIMO for NR", 3GPP TSG RAN Meeting #86, RP-193133, Agenda: 9.1.1, Samsung, Dec. 9-12, 2019, 5 pages.

"Semi-Stochastic MIMO Channel Model", Institute for Theoretical Information Technology, Retrieved on Apr. 19, 2023, Webpage available at : https://www.ti.rwth-aachen.de/research/networkDCO/sscm.php.

Claveras, "Beam tracking strategies for 5G new radio networks operating in the millimetre wave bands", Thesis, Oct. 7, 2019, 270 pages.

MITSCHELE_THIEL et al., "Long-Term Evolution (LTE)—Radio and PHY Aspects", Cellular Communication Systems, Nov. 2018, pp. 1-70.

"Discussion on Type II CSI overhead reduction", 3GPP TSG RAN WG1 Meeting #96bis, R1-1904780, Agenda: 7.2.8.1. Spreadtrum Communications, Apr. 8-12, 2019, 5 pages.

Ahmed et al., "Overhead Reduction of NR type II CSI for NR Release 16", 23rd International ITG Workshop on Smart Antennas, Apr. 24-26, 2019, pp. 1-5.

Extended European Search Report received for corresponding European Patent Application No. 20199993.5, dated Mar. 12, 2021, 11 pages.

"Enhancements on CSI framework", 3GPP Tsg Ran WG1 Meeting #91, R1-1719536, Agenda: 7.2.2.6, ZTE, Nov. 27-Dec. 1, 2017, 10 pages.

"Discussion on CSI feedback mechanism", 3GPP TSG RAN WG1 Meeting #90, R1-1712374, Agenda: 6.1.2.2.3, CATT, Aug. 21-25, 2017, 5 pages.

International Search Report and Written Opinion received for corresponding Patent Cooperation Treaty Application No. PCT/EP2021/076913, dated Jan. 4, 2022, 14 pages.

Office action received for corresponding European Patent Application No. 20199993.5, dated May 14, 2025, 9 pages.

* cited by examiner

METHOD AND APPARATUS FOR A RADIO NETWORK

RELATED APPLICATION

This application was originally filed as PCT Application No. PCT/EP2021/076913, filed on Sep. 30, 2021, which claims priority from EP application Ser. No. 20/199,993.5, filed on Oct. 5, 2020, each of which is incorporated herein by reference in its entirety.

FIELD OF THE INVENTION

Aspects of the present disclosure generally relate to wireless communication, and more particularly to methods and apparatuses for channel state information, CSI, reporting.

Various example embodiments relate to a first apparatus for transmitting CSI reporting.

Further example embodiments relate to a second apparatus for receiving CSI reporting.

Further example embodiments relate to a method for operating a first apparatus for transmitting CSI reporting.

Further example embodiments relate to a method for operating a second apparatus for receiving CSI reporting.

BACKGROUND

5G/New Radio (NR) supports periodic and semi-persistent CSI reporting on PUCCH. More specifically, the CSI reports may be carried on PUCCH formats 2 (Short PUCCH), 3, and 4 (Long PUCCH). Work to study and eventually specify aperiodic CSI reporting on PUCCH is ongoing in 5G NR Rel-17. 5G NR also supports periodic, aperiodic and semi-persistent CSI reporting on PUSCH. Various types of CSI reports are supported in NR. The following combinations of channel state information are supported CRI-RI-PMI-CQI, CRI-RI-i1, CRI-RI-i1-CQI, CRI-RI-CQI, CRI, and CRI-RSRP. These combinations may be subject to change as the 5G NR standard evolves.

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Some embodiments relate to a first apparatus comprising at least one processor, at least one receiver and at least one memory including program code that, when executed by the at least one processor, cause the first apparatus at least to receive at least one RRC configuration comprising a configuration of a channel state information, CSI, wideband report setting and a configuration of a CSI subband report setting, receive at least one message to trigger CSI wideband reporting and CSI subband reporting, and transmit based on the message to trigger CSI wideband reporting and CSI subband reporting a CSI wideband report in a first slot, the CSI wideband report comprising information on CSI wideband reporting, and transmit based on the message to trigger CSI wideband reporting and CSI subband reporting a CSI subband report in a second slot, the CSI subband report comprising information on CSI subband reporting.

According to further embodiments, the first apparatus is configured to transmit the CSI wideband report and/or to transmit the CSI subband report using PUSCH or PUCCH.

According to further embodiments, the CSI wideband report setting and the CSI subband report setting are received in one CSI report setting of the RRC configuration or at least two separate CSI report settings of the RRC configuration. The first apparatus according to any of the preceding claims, wherein the first apparatus is configured to receive at least one message to trigger CSI subband update reporting.

According to further embodiments, the first apparatus is configured to transmit a CSI subband update report comprising information on CSI subband update reporting based on the message to trigger CSI subband update reporting.

According to further embodiments, the message to trigger CSI wideband update reporting and CSI subband reporting and/or a message to trigger CSI subband update reporting comprises at least one of a RRC configuration message and/or an activation message and/or a triggering message.

According to further embodiments, the CSI subband report and/or a CSI subband update report comprise information on at least one amplitude coefficient of at least one beam.

According to further embodiments, the CSI subband report and/or a CSI subband update report comprise information on at least one phase coefficient of at least one beam.

According to further embodiments, the first apparatus is configured to transmit the CSI subband report at the next valid slot before or after the CSI wideband report.

According to further embodiments, a schedule for transmitting the CSI subband report and/or a CSI subband update report is configurable or derived based on the reporting slot for the CSI wideband report and a predefined rule for CSI subband report and/or CSI subband update report scheduling.

According to further embodiments, the first apparatus is configured to transmit information on CSI subband reporting capability.

According to further embodiments, the first apparatus is configured to receive measurement configuration information related to wideband and/or subband measurements and to receive at least one reference signal, and to perform wideband and/or subband measurements by means of the at least one reference signal.

According to further embodiments, the measurement configuration information configures one or more reference signal resources and/or one or more reference signal resource sets with similar or different transmission time offsets.

According to further embodiments, the first apparatus performs measurements for CSI wideband report and/or CSI subband report and/or CSI subband update report on the same or different reference signal resources or reference signal resource sets and/or at the same or different time offsets.

Further embodiments relate to a second apparatus comprising at least one processor, and at least one memory including computer program code that, when executed by the at least one processor, cause the second apparatus at least to transmit a RRC configuration comprising a configuration of a channel state information, CSI, wideband report setting and a configuration of a CSI, subband report setting, transmit at least one message to trigger CSI wideband reporting and CSI subband reporting, receive a CSI wideband report comprising information on CSI wideband reporting in a first slot and receive a CSI subband report comprising information on CSI subband reporting in a second slot, and merge information on CSI wideband reporting of the CSI wideband report and information on CSI subband reporting of the CSI subband report.

According to further embodiments, the CSI wideband report setting and the CSI subband report setting are configured in one CSI report setting of the RRC configuration or in at least two separate CSI report settings of the RRC configuration.

According to further embodiments, the second apparatus is configured to derive a wideband precoding factor at least from information on CSI wideband reporting of the CSI wideband report and information on CSI subband reporting of the CSI subband report.

According to further embodiments, the second apparatus is configured to transmit at least one message to trigger CSI subband update reporting.

According to further embodiments, the message to trigger CSI wideband update reporting and CSI subband reporting and/or a message to trigger CSI subband update reporting comprises at least one of a RRC configuration message and/or an activation message and/or a triggering message.

According to further embodiments, the second apparatus is configured to receive CSI subband update report comprising information on CSI subband update reporting based on the message to trigger CSI subband update reporting.

According to further embodiments, the configuration of a CSI wideband report setting comprises at least one of a scheduling indication for transmitting the CSI wideband report and/or a number Kwb of beams supported in the CSI wideband report and/or information on the message to trigger CSI wideband reporting and/or a report quantity configuration.

According to further embodiments, the configuration of a CSI, subband report setting comprises at least one of a scheduling indication for transmitting the CSI subband report and/or a number Ksb of beams supported in the CSI subband report and/or information on the message to trigger CSI subband reporting and/or on a message to trigger CSI subband update reporting and/or a report quantity configuration.

According to further embodiments, the second apparatus is configured to transmit measurement configuration information related to wideband and/or subband measurements.

According to further embodiments, the measurement configuration information configures one or more reference signal resources and/or one or more reference signal resource sets with similar or different transmission time offsets.

Further embodiments relate to a first apparatus comprising at least one processor, at least one receiver and at least one memory including program code that, when executed by the at least one processor, cause the first apparatus at least to receive at least one RRC configuration comprising a configuration of a CSI subband report setting, receive at least one message to trigger CSI subband reporting, and transmit a CSI subband report comprising information on CSI subband reporting based on the message to trigger CSI subband reporting.

Further embodiments relate to a second apparatus comprising at least one processor, and at least one memory including computer program code that, when executed by the at least one processor, cause the second apparatus at least to transmit a RRC configuration comprising a configuration of a CSI subband report setting, transmit at least one message to trigger CSI subband reporting, and receive a CSI subband report comprising information on CSI subband reporting.

Further embodiments relate to a method of operating a first apparatus comprising at least the steps of receiving at least one RRC configuration comprising a configuration of a channel state information, CSI, wideband report setting and a configuration of a CSI, subband report setting, receiving at least one message to trigger CSI wideband reporting and CSI subband reporting, transmitting a CSI wideband report comprising information on CSI wideband reporting in a first slot and transmitting a CSI subband report comprising information on CSI subband reporting in a second slot based on the message to trigger CSI wideband reporting and CSI subband reporting.

According to further embodiments, the CSI wideband report setting and the CSI subband report setting are received in one CSI report setting of the RRC configuration or at least two separate CSI report settings of the RRC configuration.

According to further embodiments, the method comprises transmitting the CSI wideband report and/or to transmit the CSI subband report using PUSCH or PUCCH.

According to further embodiments, the method comprises receiving at least one message to trigger CSI subband update reporting.

According to further embodiments, the message to trigger CSI wideband update reporting and CSI subband reporting and/or a message to trigger CSI subband update reporting comprises at least one of a RRC configuration message and/or an activation message and/or a triggering message.

According to further embodiments, the method comprises transmitting a CSI subband update report comprising information on CSI subband update reporting based on the message to trigger CSI subband update reporting.

According to further embodiments, the CSI subband report and/or a CSI subband update report comprise information on at least one amplitude coefficient of at least one beam.

According to further embodiments, the CSI subband report and/or a CSI subband update report comprise information on at least one phase coefficient of at least one beam.

According to further embodiments, the method comprises transmitting the CSI subband report at the next valid slot before or after the CSI wideband report.

According to further embodiments, the method comprises configuring a schedule for transmitting the CSI subband report and/or a CSI subband update report or deriving the schedule based on the reporting slot for the CSI wideband report and a predefined rule for CSI subband report and/or CSI subband update report scheduling.

According to further embodiments, the method comprises transmitting information on CSI subband reporting capability.

According to further embodiments, the method comprises receiving measurement configuration information related to wideband and/or subband measurements and to at least one reference signal, and performing wideband and/or subband measurements by means of the reference signal.

According to further embodiments, the method comprises configuring one or more reference signal resources and/or one or more reference signal resource sets with similar or different transmission time offsets.

According to further embodiments, the method comprises performing measurements for CSI wideband report and/or CSI subband report and/or CSI subband update report on the same or different reference signal resources or reference signal resource sets and/or at the same or different time offsets.

Further embodiments relate to a method of operating a second apparatus comprising at least the steps of transmitting a RRC configuration comprising a configuration of a channel state information, CSI, wideband report setting and a configuration of a CSI, subband report setting, transmitting at least one message to trigger CSI wideband reporting and CSI subband reporting, receiving a CSI wideband report in a first slot comprising information on CSI wideband reporting and receiving a CSI subband report comprising information on CSI subband reporting in a second slot, and merging information on CSI wideband reporting of the CSI wideband report and information on CSI subband reporting of the CSI subband report.

According to further embodiments, the CSI wideband report setting and the CSI subband report setting are configured in one CSI report setting of the RRC configuration or in at least two separate CSI report settings of the RRC configuration.

According to further embodiments, the method comprises deriving a wideband precoding factor at least from information on CSI wideband reporting of the CSI wideband report and information on CSI subband reporting of the CSI subband report.

According to further embodiments, the method comprises transmitting at least one message to trigger CSI subband update reporting.

According to further embodiments, the method comprises receiving a CSI subband update report comprising information on CSI subband update reporting based on the message to trigger CSI subband update reporting.

According to further embodiments, the message to trigger CSI wideband update reporting and CSI subband reporting and/or a message to trigger CSI subband update reporting comprises at least one of a RRC configuration message and/or an activation message and/or a triggering message.

According to further embodiments, the configuration of a CSI wideband report setting comprises at least one of a scheduling indication for transmitting the CSI wideband report and/or a number Kwb of beams supported in the CSI wideband report and/or information on the message to trigger CSI wideband reporting and/or a report quantity configuration.

According to further embodiments, the configuration of a CSI, subband report setting comprises at least one of a scheduling indication for transmitting the CSI subband report and/or a number Ksb of beams supported in the CSI subband report and/or information on the message to trigger CSI subband reporting and/or on the message to trigger CSI subband update reporting and/or a report quantity configuration.

According to further embodiments, the method comprises transmitting measurement configuration information related to wideband and/or subband measurements.

According to further embodiments, the method comprises configuring one or more reference signal resources and/or one or more reference signal resource sets with similar or different transmission time offsets.

Further embodiments relate to a first apparatus comprising receiving means to receive at least one RRC configuration comprising a configuration of a channel state information, CSI, wideband report setting and a configuration of a CSI, subband report setting, and to receive at least one message to trigger CSI wideband reporting and CSI subband reporting, and transmitting means to transmit a CSI wideband report comprising information on CSI wideband reporting in a first slot and to transmit a CSI subband report comprising information on CSI subband reporting in a second slot based on the message to trigger CSI wideband reporting and CSI subband reporting.

According to further embodiments, the first apparatus comprises transmitting means to transmit the CSI wideband report and/or to transmit the CSI subband report using PUSCH or PUCCH.

According to further embodiments, the CSI wideband report setting and the CSI subband report setting are received in one CSI report setting of the RRC configuration or at least two separate CSI report settings of the RRC configuration.

According to further embodiments, the first apparatus comprises receiving means to receive at least one message to trigger CSI subband update reporting.

According to further embodiments, the message to trigger CSI wideband update reporting and CSI subband reporting and/or a message to trigger CSI subband update reporting comprises at least one of a RRC configuration message and/or an activation message and/or a triggering message.

According to further embodiments, the first apparatus comprises transmitting means to transmit a CSI subband update report comprising information on CSI subband update reporting based on the message to trigger CSI subband update reporting.

According to further embodiments, the CSI subband report and/or a CSI subband update report comprise information on at least one amplitude coefficient of at least one beam.

According to further embodiments, the CSI subband report and/or a CSI subband update report comprise information on at least one phase coefficient of at least one beam.

According to further embodiments, the first apparatus comprises transmitting means to transmit the CSI subband report at the next valid slot before or after the CSI wideband report.

According to further embodiments, the first apparatus comprises processing means to configure a schedule for transmitting the CSI subband report and/or a CSI subband update report.

According to further embodiments, the first apparatus comprises transmitting means to transmit information on CSI subband reporting capability.

According to further embodiments, the first apparatus comprises receiving means to receive measurement configuration information related to wideband and/or subband measurements and to at least one reference signal, and measuring means to perform wideband and/or subband measurements by means of the at least one reference signal.

According to further embodiments, the measurement configuration information configures one or more reference signal resources and/or one or more reference signal resource sets with similar or different transmission time offsets.

According to further embodiments, the first apparatus comprises means to perform measurements for CSI wideband report and/or CSI subband report and/or CSI subband update report on the same or different reference signal resources or reference signal resource sets and/or at the same or different time offsets.

Further embodiments relate to a second apparatus comprising processing means to transmit a RRC configuration comprising a configuration of a channel state information, CSI, wideband report setting and a configuration of a CSI, subband report setting, and transmitting means to transmit at least one message to trigger CSI wideband reporting and CSI subband reporting, and receiving means to receive a CSI wideband report comprising information on CSI wideband reporting in a first slot and receive a CSI subband report comprising information on CSI subband reporting in a second slot, and processing means to merge information on CSI wideband reporting of the CSI wideband report and information on CSI subband reporting of the CSI subband report.

According to further embodiments, the CSI wideband report setting and the CSI subband report setting are configured in one CSI report setting of the RRC configuration or in at least two separate CSI report settings of the RRC configuration.

According to further embodiments, the second apparatus comprises processing means to derive a wideband precoding factor at least from information on CSI wideband reporting of the CSI wideband report and information on CSI subband reporting of the CSI subband report.

According to further embodiments, the second apparatus comprises transmitting means to transmit at least one message to trigger CSI subband update reporting.

According to further embodiments, the message to trigger CSI wideband update reporting and CSI subband reporting and/or a message to trigger CSI subband update reporting comprises at least one of a RRC configuration message and/or an activation message and/or a triggering message.

According to further embodiments, the second apparatus comprises receiving means to receive CSI subband update report comprising information on CSI subband update reporting based on the message to trigger CSI subband update reporting.

According to further embodiments, the configuration of a CSI wideband report setting comprises at least one of a scheduling indication for transmitting the CSI wideband report and/or a number Kwb of beams supported in the CSI wideband report and/or information on the message to trigger CSI wideband reporting and/or a report quantity configuration.

According to further embodiments, the configuration of a CSI, subband report setting comprises at least one of a scheduling indication for transmitting the CSI subband report and/or a number Ksb of beams supported in the CSI subband report and/or information on the message to trigger CSI subband update and/or on the message to trigger CSI subband update reporting and/or a report quantity configuration.

According to further embodiments, the second apparatus comprises means to transmit measurement configuration information related to wideband and/or subband measurements.

According to further embodiments, the second apparatus comprises means to configure one or more reference signal resources and/or one or more reference signal resource sets with similar or different transmission time offsets.

According to further embodiments, the second apparatus comprises receiving means to receive at least one RRC configuration comprising a configuration of a CSI subband report setting and/or to receive at least one message to trigger CSI subband reporting, and transmitting means to transmit a CSI subband report comprising information on CSI subband reporting based on the message to trigger CSI subband reporting.

According to further embodiments, the second apparatus comprises processing means to configure a first apparatus with a RRC configuration comprising a configuration of a CSI subband report setting, transmitting means to transmit at least one message to trigger CSI subband reporting, and receiving means to receive a CSI subband report comprising information on CSI subband reporting.

DESCRIPTION OF THE EMBODIMENTS

Figure 1:
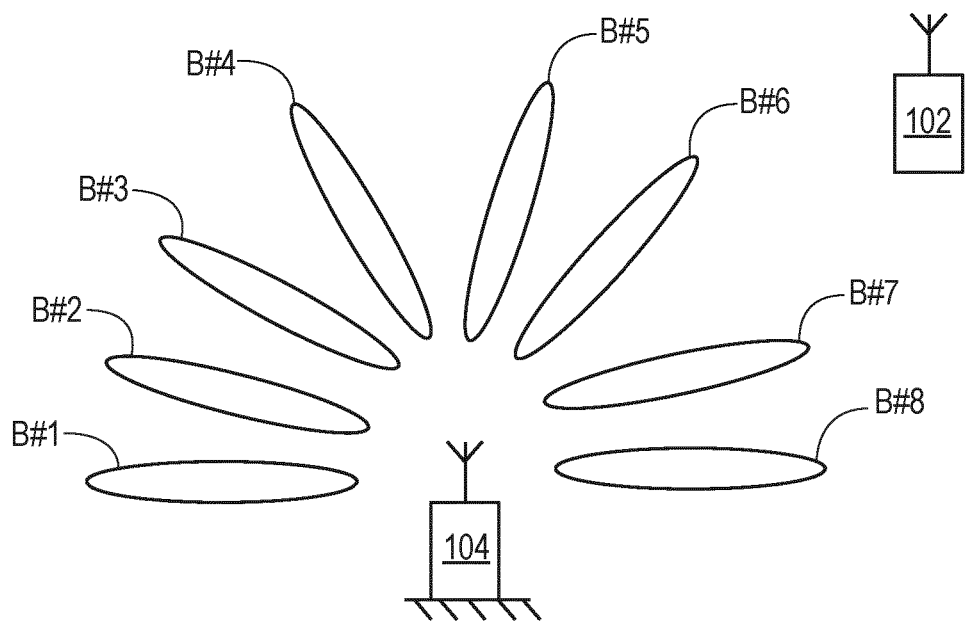
FIG. 1 depicts schematically an example of a radio access network.

FIG. 1 schematically depicts an example of a radio access network, RAN. The RAN may be a next generation RAN (NG-RAN). The RAN comprises a first apparatus 102 configured to send data to and receive data from a second apparatus 104. The second apparatus 104 provides exemplarily eight beams B #1 to B #8 for serving the first apparatus 102.

The first apparatus 102 may be a user equipment, UE.

The second apparatus 104 may be a network entity, e.g. a next generation evolved node B gNB, a next generation evolved node B central unit, gNB-CU or a next generation evolved node B distributed unit, gNB-DU.

Figure 5A:
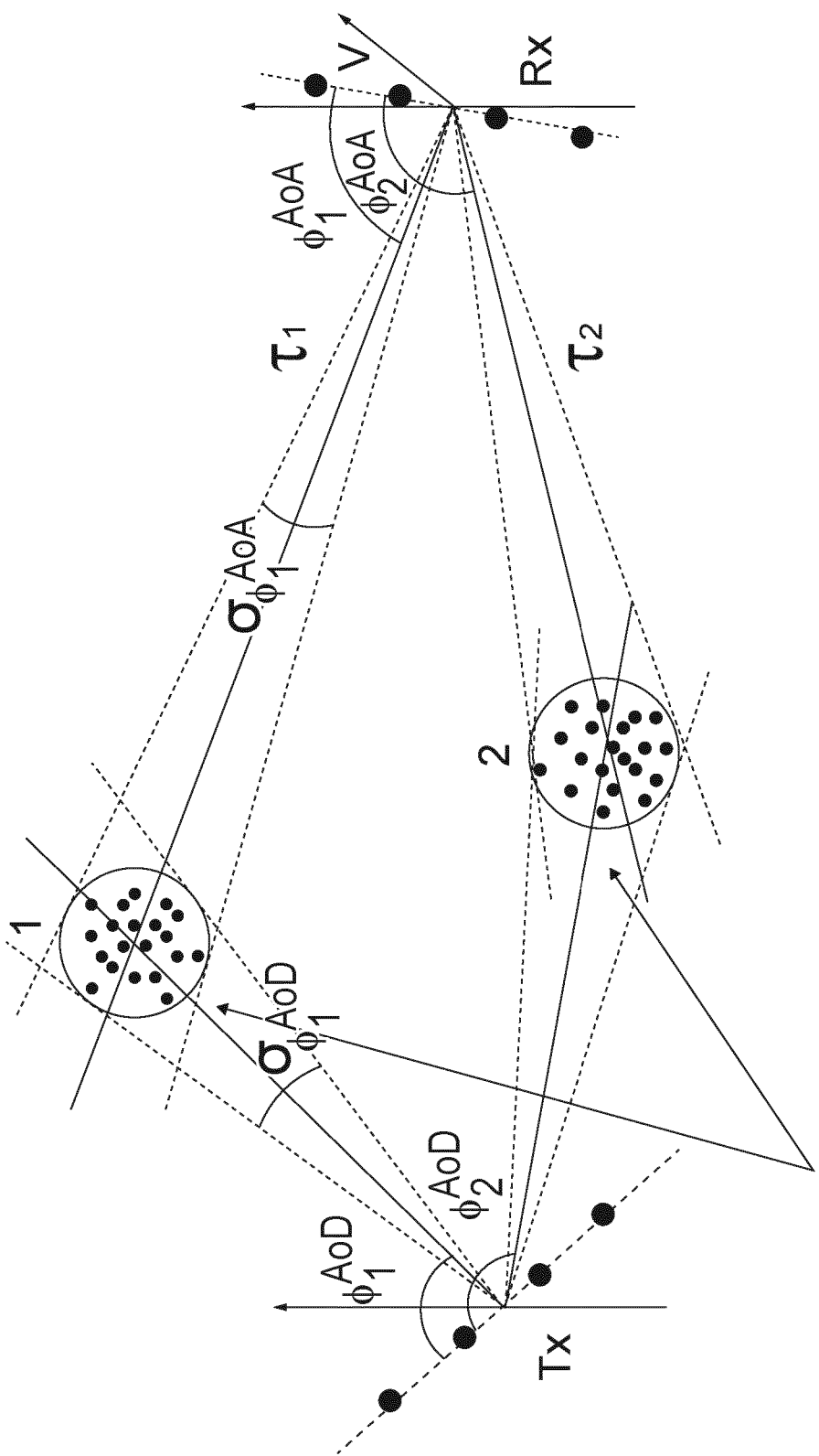
FIG. 5 depicts schematically aspects of wideband and subband representation of a radio channel.
Figure 5B:
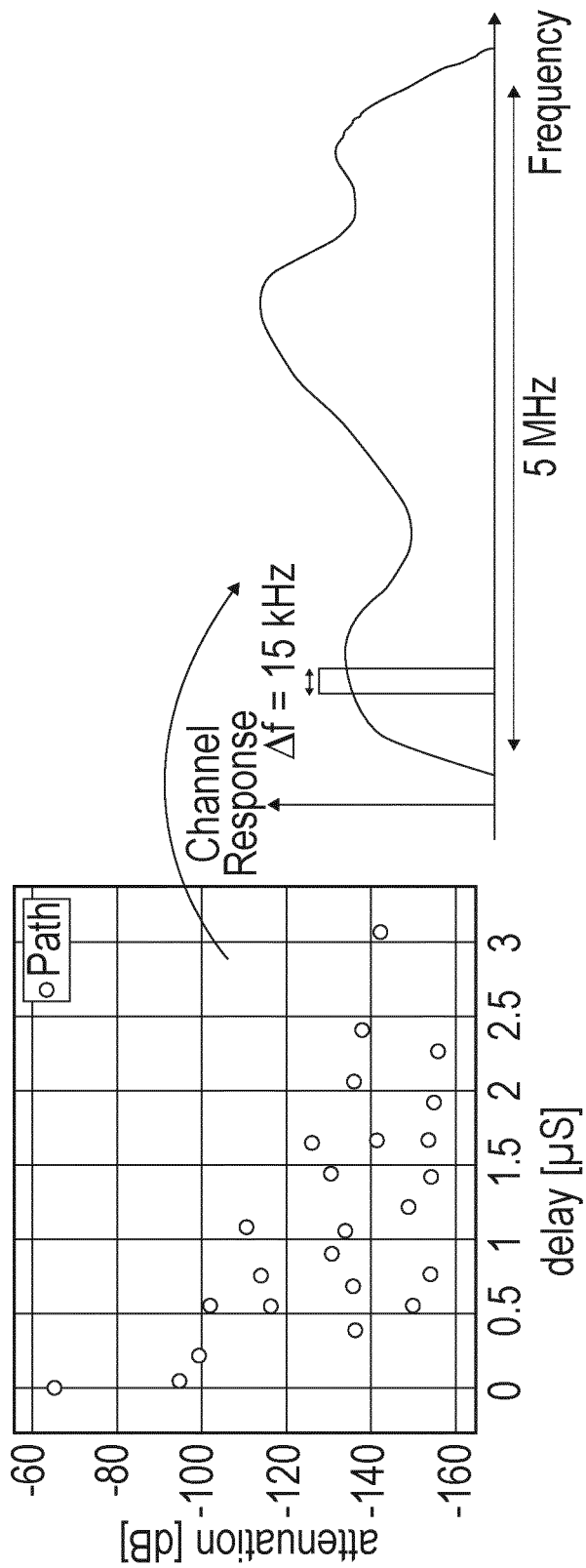

The first apparatus 102 may be instructed to generate CSI reports to the second apparatus 104. In 3GPP, CSI feedback may be treated as feedback of channel coefficients and/or precoding matrix indices (PMI), CQI, L1-RSRP, L1-SINR, RI, LI, wideband indication. The propagation environment may be distinguished between wideband, WB, factors, and subband, SB, factors. Wideband factors are considered to be long term stable and to be the same for the whole bandwidth and change slowly. Wideband factors may represent the spatial support of a channel, i.e. the main "beam(s)". Wideband factors may also represent the delay support of the channel, i.e. channel paths delays. Subband factors are considered to be short term stable and to change over the used communication bandwidth. A cause for subband factors is due to small scale fading, i.e. frequency selective fading caused by a delay spread between signal sub-paths in the propagation environment. FIG. 5A depicts illustratively wideband spatial support representation. FIG. 5B depicts schematically subband representation of frequency selective fading in the frequency domain from path delays.

The first apparatus 102 may comprise at least one processor, at least one transmitter, at least one receiver and at least one memory including program code that, when executed by the at least one processor, cause the first apparatus 102 at least to perform steps in the methods described below with regard to FIG. 2.

Various embodiments may refer to a first apparatus 102 comprising at least one processor, at least one receiver and at least one memory including program code that, when executed by the at least one processor, cause the first apparatus 102 at least to receive at least one RRC configuration comprising a configuration of a channel state information, CSI, wideband report setting and a configuration of a CSI, subband report setting, receive at least one message to trigger CSI wideband reporting and CSI subband reporting, and transmit based on the message to trigger CSI wideband reporting and CSI subband reporting a CSI wideband report in a first slot, the CSI wideband report comprising information on CSI wideband reporting, and transmit based on the message to trigger CSI wideband reporting and CSI subband reporting a CSI subband report in a second slot, the CSI subband report comprising information on CSI subband reporting.

Various embodiments may refer to a first apparatus 102 comprising at least one processor, at least one receiver and at least one memory including program code that, when executed by the at least one processor, cause the first apparatus 102 at least to receive at least one RRC configuration comprising a configuration of a CSI subband report setting, receive at least one message to trigger CSI subband reporting, and transmit a CSI wideband report comprising information on CSI wideband reporting in a first slot and transmit CSI subband report comprising information on CSI subband reporting in a second slot based on the message to trigger CSI wideband reporting and CSI subband reporting.

The second apparatus 104 may comprise at least one processor, at least one transmitter, at least one receiver, and at least one memory including computer program code that, when executed by the at least one processor cause the second apparatus 104 at least to perform steps in the methods described below with regard to FIG. 2.

Various embodiments may refer to a second apparatus 104 comprising at least one processor, and at least one memory including computer program code that, when executed by the at least one processor, cause the second apparatus 104 at least to transmit a configuration of a channel state information, CSI, wideband report setting and a configuration of a CSI, subband report setting, transmit at least one message to trigger CSI wideband reporting and CSI subband reporting, receive a CSI wideband report comprising information on CSI wideband reporting in a first slot and receive a CSI subband report comprising information on CSI subband reporting in a second slot, and merge information on CSI wideband reporting of the CSI wideband report and information on CSI subband reporting of the CSI subband report.

Various embodiments may refer to a second apparatus 104 comprising at least one processor, and at least one memory including computer program code that, when executed by the at least one processor, cause the second apparatus 104 at least to transmit a RRC configuration comprising a configuration of a CSI subband report setting, transmit at least one message to trigger CSI subband reporting, and receive a CSI subband report comprising information on CSI subband reporting.

Figure 2:
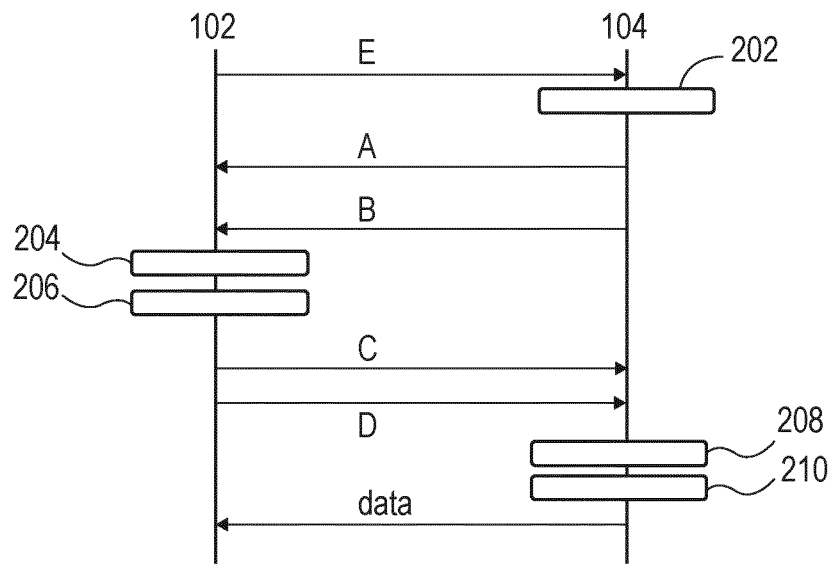
FIG. 2 depicts a sequence diagram.

FIG. 2 schematically depicts a sequence diagram comprising aspects of instructing the first apparatus 102 to generate CSI reports to the second apparatus 104.

The second apparatus 104 may send a first message A. The second apparatus 104 may send a second message B.

The first apparatus 102 may receive the first message A. The first apparatus 102 may be receive the second message B.

The second apparatus 104 may determine a configuration for the first apparatus 102 in a step 202. The content of the first message A and of the second message B may be determined in step 202.

The first message A may comprise a RRC configuration comprising a configuration of a channel state information, CSI, wideband report setting and a configuration of a CSI, subband report setting. The CSI wideband report setting and the CSI subband report setting may be configured in one CSI report setting of the RRC configuration or at least two separate CSI report settings of the RRC configuration.

The second message B may comprise at least one message to trigger CSI wideband reporting and CSI subband reporting. The second message B may be sent via RRC configuration. Alternatively, or additionally, at least part of the second message B may be sent through DCI and/or MAC CE.

Based on a time domain behavior of the CSI reporting, either periodic or semi-persistent or aperiodic, different configuration or reconfiguration in RRC might be needed. When triggering is indicated DCI, a trigger state in the CSI request field of the DCI is indicated. DCI can be used to trigger both semi-persistent and aperiodic on PUSCH. Periodic CSI reporting may be configured via RRC message. No dynamic triggering and/or activation might be needed. Semi-persistent CSI reporting may be configured via RRC message. Activation may be sent via MAC CE for CSI reporting on PUCCH and Triggering may be sent via DCI for CSI reporting on PUSCH. A trigger state sub-selection may be sent via MAC CE. Aperiodic CSI reporting may be configured via RRC message. Triggering may be sent via DCI for CSI reporting on PUSCH. A trigger state sub-selection may be sent via MAC CE.

The first apparatus 102 may transmit a third message C. The first apparatus 102 may transmit a fourth message D.

The first apparatus 102 may be configured to perform wideband measurements in a step 204 by means of a reference signal. The first apparatus 102 may be configured to perform subband measurements in a step 206 by means of a reference signal. The first message A and/or the second message B may further comprise measurement configuration information related to wideband and/or subband measurements and to at least one reference signal. The measurement configuration information may configure one or more reference signal resources and/or one or more reference signal resource sets with similar or different transmission time offsets. The first apparatus 102 may perform measurements for CSI wideband report and/or CSI subband report and/or CSI subband update report on the same or different reference signal resources or reference signal resource sets and/or at the same or different time offsets.

The content of the third message C may be determined in step 204. The content of the fourth message D may be determined in step 206.

The third message C may comprise a CSI wideband report comprising information on CSI wideband reporting. The information on CSI wideband reporting may comprise information on wideband coefficients. In 3GPP, Type I/II codebooks for wideband coefficients the following abbreviations may be used: i1/W1/a(WB).

The third message C may be a PUCCH or a PUSCH transmission.

The fourth message D may comprise a CSI subband report comprising information on CSI subband reporting. The information on CSI subband reporting may comprise information on subband coefficients. In 3GPP Type I/II codebooks for subband coefficients the following abbreviations may be used: i2/W2/a (SB).

The fourth message D may be a PUSCH transmission or a PUCCH transmission.

According to one aspect, the second apparatus 104 may merge information on CSI wideband reporting of the CSI wideband report and information on CSI subband reporting of the CSI subband report in a step 208. According to one aspect, the second apparatus may merge information to derive a multi-beam frequency selective precoder.

According to one aspect, a CSI wideband factor W1 of Type II codebook may be derived from CRI-RSRP beam management report in step 208. The CSI wideband factor W1 may be used to build frequency selective Type II precoder.

A Type II precoder may be described as follows $$w_{r,l} = \sum_{i=0}^{L-1} w_{k_1^{(i)} k_2^{(i)}} \cdot p_{r,l,i}^{(WB)} \cdot p_{r,l,i}^{(SB)} \cdot \varphi_{r,l,i}$$

wherein $w_{r,l}$ may represent the Type II precoder for polarization r on layer l, $v_{k_1^{(i)} k_2^{(i)}}$ may represent a selected basis vector (beam) i, $p_{r,l,i}^{(WB)}$ may represent a wideband beam amplitude for beam i on polarization r on layer l, $p_{r,l,i}^{(SB)}$ may represent a subband beam amplitude for beam i on polarization r on layer l, and $\varphi_{r,l,i}$ may represent a phase coefficient for beam i on polarization r and layer I.

The selected basis vector (beam) i $v_{k_1^{(i)} k_2^{(i)}}$ be known at the second apparatus 104. The basis vectors may be taken from an oversampled 2D DFT codebook, and may be found by matching to the actual beampattern (min MSE or other criteria) used by the second apparatus 104 to beamform each of the CSI-RS in the CSI-RS set used for beam management.

$$v_{l,m} = t_l \otimes u_m$$

$$t_l = \left[ 1 \quad e^{j\frac{2\pi l}{O_1 N_1}} \quad \ldots \quad e^{j\frac{2\pi l(N_1-1)}{O_1 N_1}} \right]^T$$

$$u_m = \left[ 1 \quad e^{j\frac{2\pi m}{O_2 N_2}} \quad \ldots \quad e^{j\frac{2\pi m(N_2-1)}{O_2 N_2}} \right]^T$$

The wideband beam amplitude for beam i on polarization r on layer l $p_{r,l,i}^{(WB)}$ may be taken from the differential RSRP values, possibly normalized by the RSRP of the strongest beam.

The wideband precoding factor W1 may be derived from the combination of the selected basis vector (beam) i $v_{k_1^{(i)} k_2^{(i)}}$ and wideband beam amplitude for beam i on polarization r on layer l $p_{r,l,i}^{(WB)}$ (possibly normalized) for the "L best beams".

The subband amplitude $p_{r,l,i}^{(SB)}$ may be provided by the CSI subband report. Additionally, the phase coefficient $\varphi_{r,l,i}$ may also be provided by the CSI subband report. Alternatively, the phase coefficient $\varphi_{r,l,i}$ may be chosen as "1", with limited effect on performance.

The bitwidth for CRI, SSBRI, RSRP, and differential RSRP may be provided according to the following table

| Field | Bitwidth |
| --- | --- |
| CRI | $\lceil \log_2(K_s^{CSI-RS}) \rceil$ |
| SSBRI | $\lceil \log_2(K_s^{SSB}) \rceil$ |
| RSRP | 7 |
| Differential RSRP | 4 | where $K_s^{CSI-RS}$ is the number of CSI-RS resources in the corresponding resource set, and $K_s^{SSB}$ is the configured number of SS/PBCH blocks in the corresponding resource set for reporting 'ssb-Index-RSRP'.

The mapping order of CSI fields of one report for CRI/RSRP or SSBRI/RSRP reporting may be provided according to the following table:

| CSI report number | CSI fields |
| --- | --- |
| CSI report #n | CRI or SSBRI #1, if reported |
| | CRI or SSBRI #2, if reported |
| | CRI or SSBRI #3, if reported |
| | CRI or SSBRI #4, if reported |
| | RSRP #1, if reported |
| | Differential RSRP #2, if reported |
| | Differential RSRP #3, if reported |
| | Differential RSRP #4, if reported |

According to one aspect, the second apparatus 104 may perform PDSCH precoding operation in a step 210.

According to one aspect, the first apparatus 102 may be configured to transmit a fifth message E. The fifth message E may comprise information on CSI subband reporting capability of the first apparatus 102.

The second apparatus 104 may receive the fifth message E.

The determination of the configuration for the first apparatus 102 in a step 202 may be based upon receiving of the fifth message E.

A format of the CSI subband report and/or a format of the CSI wideband report may be configured in the RRC configuration and added to the measurement configuration.

The format of the CSI subband report and/or the format of the CSI wideband report may comprise information on the report quantity, e.g., CSI parameters to be reported such as RI, PMI, CQI, layer indicator (Li) and CSI-RS resource indicator (CRI). The report quantity in the CSI wideband report format may be named "cri-RI-i1", "cri-RI-i1-CQI", "cri-RI-i1-Phase", or "cri-RI-i1-Phase-CQI". The report quantity in the CSI subband report format may be named accordingly "cri-RI-i2", "cri-RI-i2-CQI", "cri-RI-i2-Phase", or "cri-RI-i2-Phase-CQI".

| reportQuantity | CHOICE { |
| --- | --- |
| none | NULL, |
| cri-RI-PMI-CQI | NULL, |
| cri-RI-i1 | NULL, |
| cri-RI-i1-CQI | SEQUENCE { |
| pdsch-BundleSizeForCSI | ENUMERATED {n2, n4} |
| OPTIONAL -- Need S | |
| }, | |
| cri-RI-CQI | NULL, |
| cri-RSRP | NULL, |
| ssb-Index-RSRP | NULL, |
| cri-RI-LI-PMI-CQI | NULL |
| }, | |

According to one aspect, the CSI subband report may comprise information on at least one amplitude coefficient of at least one beam.

According to one aspect, the CSI subband report may comprise information on at least one phase coefficient of at least one beam.

According to one aspect, the CSI subband report may comprise the following data structure or least one or more elements of the following data structure to transmit the content of the CSI subband report as UCI:

| CSI report number | CSI fields |
| --- | --- |
| CSI report #n | CRI or SSBRI #1, if reported |
| | CRI or SSBRI #2, if reported |
| | ... |

-continued

| CSI report number | CSI fields |
|---|---|
| | CRI or SSBRI #Ksb, if reported |
| | Amplitude coefficients #1, per subband with increasing order of subband number, if reported. The first amplitude of this field is normalized to 1 and all others are reported differentially. |
| | Differential amplitude coefficients #2, per subband with increasing order of subband number, if reported |
| | ... |
| | Differential amplitude coefficients #Ksb per subband with increasing order of subband number, if reported |
| | Phase coefficients #1, per subband with increasing order of subband number, if reported. |
| | Differential phase coefficients #2, per subband with increasing order of subband number, if reported |
| | ... |
| | Differential phase coefficients #Ksb per subband with increasing order of subband number, if reported |
| | Rank indicator, if reported |

Subbands for a given CSI subband report n indicated by the higher layer parameter csi-ReportingBand may be numbered continuously in the increasing order with the lowest subband of csi-ReportingBand as subband 0.

Kwb indicates the number of beams supported in the CSI wideband report and Ksb indicates the number of beams supported in the CSI subband report, wherein it may apply Ksb≤Kwb. For example Kwb is set to 4. Alternatively, for legacy compatibility reasons, Kwb may be set to be equivalent to the higher layer parameter "nrofReportedRS", if "groupBasedBeamReporting=disabled", and is set to "2" if "groupBasedBeamReporting=enabled" in the CSI report format.

| groupBasedBeamReporting | CHOICE { |
|---|---|
|    enabled |   NULL, |
|    disabled |   SEQUENCE { |
|      nrofReportedRS |     ENUMERATED {n1, n2, n3, n4} |
| OPTIONAL -- Need S | |
|   } | |
| }, | |

The first message A, for example the RRC configuration, and/or for example the configuration of the CSI wideband report setting and/or the configuration of the CSI subband report setting may comprise at least one of a scheduling indication for transmitting the CSI wideband report in a first slot and/or a scheduling indication for transmitting the CSI subband report in a second slot.

The scheduling indication for transmitting the CSI subband report may be configurable. Additionally, or alternatively, the CSI subband report may be transmitted at the offset between two TDMed, time division multiplexed UCI occasions.

The first apparatus 102 may be configured to transmit the CSI subband report at the next valid slot before or after the CSI wideband report.

Figure 3:
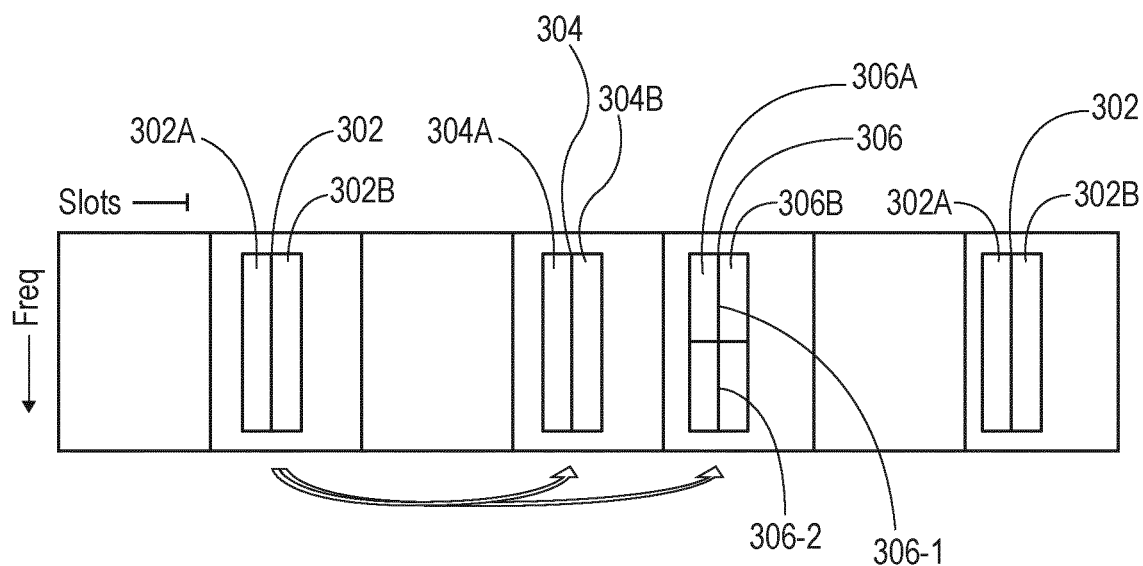
FIG. 3 depicts schematically a first example.

FIG. 3 depicts schematically a first example of scheduling of CSI reports.

A first apparatus 102, for example a UE, may receive a message 302 to trigger CSI wideband reporting and CSI subband reporting. CSI wideband reporting and CSI subband reporting may be triggered with the same CSI request.

The message 302 may be sent by a second apparatus 104, for example a gNB. The message 302 may be embodied by a message B and/or may be part of a message B transmitted from the second apparatus 104 to the first apparatus 102.

According to one aspect, the message 302 may comprise a first trigger indication 302A to trigger CSI wideband reporting and CSI subband reporting of a first beam and/or a second trigger indication 302B to trigger CSI wideband reporting and CSI subband reporting of a second beam.

According to one aspect, the message 302 may comprise at least one further trigger indication to trigger CSI wideband reporting and CSI subband reporting of a number Ksb beams.

According to one aspect, upon receiving of the message 302 and/or 302A and/or 302B, a CSI wideband report 304 comprising information on CSI wideband reporting may be transmitted in a first slot.

According to one aspect, the CSI wideband report 304 may comprise a first CSI wideband beam report 304A comprising information on CSI wideband reporting on a first beam. Further, the CSI wideband report 304 may comprise a second CSI wideband beam report 304B comprising information on CSI wideband reporting on a second beam. Alternatively, and/or additionally, the CSI wideband report may comprise at least one further CSI wideband beam report comprising information on CSI wideband reporting on a further beam. For example, the CSI wideband report 304 may comprise a number of Kwb CSI wideband beam reports for the Kwb best beams, wherein Kwb≤Kmax. Kmax may be defined as the number of CSI-RS resources in the resource set used for WB report measurements and computation.

According to one aspect, upon receiving of the message 302 and/or 302A and/or 302B, a CSI subband report 306 comprising information on CSI subband reporting may be transmitted in a second slot.

According to one aspect, the CSI subband report 306 may comprise a first CSI subband beam report 306A comprising information on CSI subband reporting on a first beam. Further, the CSI subband report 306 may comprise a second CSI subband beam report 306B comprising information on CSI subband reporting on a second beam. Alternatively, and/or additionally, the CSI subband report 306 may comprise at least one further CSI subband beam report comprising information on CSI subband reporting on a further beam. For example, the CSI subband report 306 may comprise a number of Ksb CSI subband beam reports for the Ksb best beams, wherein Ksb≤Kwb.

According to one aspect, the CSI subband report 306 may comprise a first indication 306-1 on information on CSI subband reporting on a first subband. Further, the CSI subband report 306 may comprise a second indication 306-2 on information on CSI subband reporting on a second subband. Alternatively, and/or additionally, the CSI subband report may comprise at least one further indication on information on CSI subband reporting on a further subband.

According to one aspect, the CSI wideband report 304 and the CSI subband report 306 may be jointly scheduled. According to one aspect, backwards compatibility with beam sweeping procedure is achieved by transmitting the CSI wideband report 304 and the CSI subband report 306 in different slots. The CSI subband report 306 may be transmitted at the next valid slot after the CSI wideband report 304. Alternatively, the CSI subband report 306 may be transmitted at the next valid slot before the CSI wideband report 304.

Figure 4:
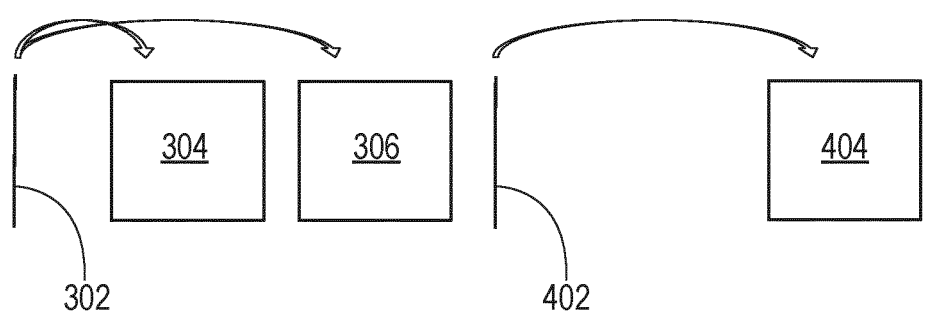
FIG. 4 depicts schematically a second example.

FIG. 4 depicts schematically a second example of scheduling of CSI reports.

A first apparatus 102, for example a UE, may receive a message 302 to trigger CSI wideband reporting and CSI subband reporting. CSI wideband reporting and CSI subband reporting may be triggered with the same CSI request. The message 302 may be sent by a second apparatus 104, for example a gNB. The message 302 may be embodied by a message B and/or may be part of a message B transmitted from the second apparatus 104 to the first apparatus 102.

According to one aspect, upon receiving of the message 302 a CSI wideband report 304 comprising information on CSI wideband reporting may be transmitted in a first slot.

According to one aspect, upon receiving of the message 302 a CSI subband report 306 comprising information on CSI subband reporting may be transmitted in a second slot.

The first apparatus 102, for example a UE, may receive a message 402 to trigger CSI subband update reporting. The message 402 may trigger CSI subband reporting only. The message 402 may be sent by a second apparatus 104, for example a gNB.

According to one aspect, upon receiving of the message 402 a CSI subband update report 404 comprising information on CSI subband update reporting may be transmitted. According to one aspect, a quicker update and/or a lower payload is received by transmitting the CSI subband update report 404.

According to one aspect, the CSI subband report 404 may be used to update frequency selective Type II precoder build in step 208.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

Certain abbreviations that may be found in the description and/or in the figures are herewith defined as follows:

CU Central Unit of gNodeB/BS
DU Distributed Unit of gNodeB/BS
BS Base station
CQI Channel Quality indicator
CSI Channel State Information
CSI-RS Channel State Information reference signal
CRI CSI-RS resource indicator
DCI downlink control information
FR2 Frequency range 2 (24.25 GHz to 52.6 GHz)
FR3 Frequency range 3 (>60 GHz, not yet fully specified)
FS frequency selective
gNB next generation evolved node B
gNB-CU evolved node B central unit
gNB-DU next generation evolved node B distributed unit
LL low latency
MAC Medium Access Control
MAC CE Medium Access Control (layer) Control Element
MIMO Multiple input multiple output
MU Multi-user
NR New Radio (3GPP 5G)
PMI Precoding matrix index
PDCCH Physical Downlink Control Channel
PDSCH Physical Downlink Shared Channel
PUCCH Physical Uplink Control Channel
PUSCH Physical Uplink Shared Channel
RRC Radio Resource Control (layer)
RSRP Reference signal received power
RU Radio unit, usually main part of DU
SB subband
SSB SS/PBCH block
SSBRI SSB resource indicator
SU Single-user
TS technical specification
UCI Uplink Control Information
UE User Equipment
WB wideband

The invention claimed is:

1. A first apparatus comprising at least one processor, at least one receiver and at least one memory including program code that, when executed by the at least one processor, cause the first apparatus at least to:
receive at least one RRC configuration comprising a configuration of a channel state information, CSI, wideband report setting and a configuration of a CSI subband report setting, receive at least one message to trigger CSI wideband reporting and CSI subband reporting,
transmit based on the message to trigger CSI wideband reporting and CSI subband reporting a CSI wideband report in a first slot, the CSI wideband report comprising information on CSI wideband reporting, and
transmit based on the message to trigger CSI wideband reporting and CSI subband reporting a CSI subband report in a second slot, the CSI subband report comprising information on CSI subband reporting,
wherein the first apparatus is configured to transmit a CSI subband update report comprising information only on CSI subband update reporting based on a message to trigger CSI subband update reporting received by the first apparatus,
wherein the CSI subband report and a CSI subband update report comprise information on at least one amplitude coefficient of at least one beam and information on at least one phase coefficient of at least one beam,
wherein a schedule for transmitting the CSI subband report and a CSI subband update report is derived based on the first slot of the CSI wideband report and a predefined rule for CSI subband report and CSI subband update report scheduling.

2. The first apparatus according to claim 1, wherein the first apparatus is configured to transmit information on CSI subband reporting capability.

3. The first apparatus according to claim 2, wherein the first apparatus is configured to receive measurement configuration information related to wideband, and subband measurements and to receive at least one reference signal, wherein the measurement configuration information configures one or more reference signal resources and one or more reference signal resource sets with similar or different transmission time offsets and wherein the first apparatus is further configured to perform wideband and subband measurements via the at least one reference signal based on the measurement configuration information.

4. A second apparatus comprising at least one processor, and at least one memory including computer program code that, when executed by the at least one processor, cause the second apparatus at least to:

transmit a RRC configuration comprising a configuration of a channel state information, CSI, wideband report setting and a configuration of a CSI, subband report setting, transmit at least one message to trigger CSI wideband reporting and CSI subband reporting, receive a CSI wideband report comprising information on CSI wideband reporting in a first slot and receive a CSI subband report comprising information on CSI subband reporting in a second slot, merge information on CSI wideband reporting of the CSI wideband report and information on CSI subband reporting of the CSI subband report, the CSI subband report comprising information on at least one amplitude coefficient of at least one beam and information on at least one phase coefficient of at least one beam, and transmit at least one message to trigger only CSI subband update reporting, wherein the message to trigger CSI wideband update reporting and CSI subband reporting and a message to trigger CSI subband update reporting comprises a RRC configuration message, an activation message, and a triggering message, wherein the configuration of a CSI wideband report setting comprises a scheduling indication for transmitting the CSI wideband report, a number Kwb of beams supported in the CSI wideband report, information on the message to trigger CSI wideband reporting, and a report quantity configuration and wherein the configuration of a CSI, subband report setting comprises a scheduling indication for transmitting the CSI subband report, a number Ksb of beams supported in the CSI subband report, information on the message to trigger CSI subband reporting and on a message to trigger CSI subband update reporting, and a report quantity configuration.

5. The second apparatus according to claim 4, wherein the CSI wideband report setting and the CSI subband report setting are configured in one CSI report setting of the RRC configuration or in at least two separate CSI report settings of the RRC configuration.

6. The second apparatus according to claim 4, wherein the second apparatus is configured to derive a wideband precoding factor at least from information on CSI wideband reporting of the CSI wideband report and information on CSI subband reporting of the CSI subband report.

7. A method of operating a first apparatus comprising at least:

receiving at least one RRC configuration comprising a configuration of a channel state information, CSI, wideband report setting and a configuration of a CSI, subband report setting, receiving at least one message to trigger CSI wideband reporting and CSI subband reporting, transmitting based on the message to trigger CSI wideband reporting and CSI subband reporting a CSI wideband report in a first slot, the CSI wideband report comprising information on CSI wideband reporting, and transmitting based on the message to trigger CSI wideband reporting and CSI subband reporting a CSI subband report in a second slot, the CSI subband report comprising information on CSI subband reporting, the method further comprising:

receiving at least one message to trigger CSI subband update reporting, transmitting a CSI subband update report based on a message to trigger CSI subband update reporting, the CSI subband update report comprising information on CSI subband update reporting, transmitting information on CSI subband reporting capability, receiving measurement configuration information related to wideband and subband measurements, receiving at least one reference signal, and performing wideband and subband measurements via at least one reference signal based on a measurement configuration information.

8. A method of operating a second apparatus comprising:

transmitting a RRC configuration comprising a configuration of a channel state information, CSI, wideband report setting and a configuration of a CSI, subband report setting, transmitting at least one message to trigger CSI wideband reporting and CSI subband reporting, receiving a CSI wideband report in a first slot comprising information on CSI wideband reporting and receiving a CSI subband report comprising information on CSI subband reporting in a second slot, and merging information on CSI wideband reporting of the CSI wideband report and information on CSI subband reporting of the CSI subband report, deriving a wideband precoding factor at least from information on CSI wideband reporting of the CSI wideband report and information on CSI subband reporting of the CSI subband report, transmitting at least one message to trigger CSI subband update reporting, receiving a CSI subband update report comprising information on CSI subband update reporting based on a message to trigger CSI subband update reporting, and transmitting measurement configuration information related to wideband and subband measurements.

* * * * *